United States Patent
Kaaden et al.

(10) Patent No.: US 6,389,219 B1
(45) Date of Patent: May 14, 2002

(54) METHOD AND DEVICE FOR CONTROLLING THE PHASE RELATION BETWEEN A HEAD DRUM AND TAPE FEED SYSTEM OF A MAGNETIC TAPE RECORDING DEVICE

(75) Inventors: Jürgen Kaaden, Villingen-Schwenningen; Peter Mahr, Konigsfeld, both of (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/037,729

(22) Filed: Mar. 9, 1998

Related U.S. Application Data

(63) Continuation-in-part of application No. 08/649,703, filed on Jul. 30, 1996, now abandoned.

(51) Int. Cl.[7] .................................................. H04N 5/95
(52) U.S. Cl. .............................. 386/85; 386/68; 386/78
(58) Field of Search ............................. 386/68, 80, 81, 386/85, 86, 113, 78; 360/75, 76, 77.01, 77.06, 77.12, 77.13; H04N 5/95

(56) References Cited

U.S. PATENT DOCUMENTS

| | | | | |
|---|---|---|---|---|
| 4,542,419 A | * | 9/1985 | Morio et al. | 386/101 |
| 4,714,971 A | * | 12/1987 | Sigiki et al. | 360/77.15 |
| 4,866,543 A | * | 9/1989 | Cooper et al. | 386/75 |
| 4,882,633 A | * | 11/1989 | Nakatani et al. | 386/87 |
| 5,432,655 A | * | 7/1995 | Nakamura et al. | 360/77.14 |
| 5,570,248 A | * | 10/1996 | Ido et al. | 360/77.14 |
| 5,677,807 A | * | 10/1997 | Sakai | 360/77.13 |

FOREIGN PATENT DOCUMENTS

| | | | | |
|---|---|---|---|---|
| DE | 4343809 A | * | 6/1995 | G11B/15/467 |

* cited by examiner

*Primary Examiner*—Vincent F. Boccio
(74) *Attorney, Agent, or Firm*—Joseph S. Tripoli; Frederick A. Wein

(57) ABSTRACT

A method for controlling a phase relation between a head drum and a tape feed system, of a type wherein digital picture data is subdivided into blocks having an assigned pointer value each and wherein the pointer values define which part of the picture the block of picture data represents includes the steps of: incrementing or decrementing a location in a measured value with a corresponding pointer value with corresponding data block in a reproduced data stream, monitoring the content of the locations in the measured value store after a certain amount of reproducing time by means of determining the distance between pointer value regions which have been reproduced more often than the regions in-between, thereby taking into account the difference in reproducing frequency between the more often reproduced regions and the more seldom reproduced regions according to the measured value store entries, and determining a phase correction value for the control of the phase relation between the head drum and the tape feed systems based on the distance between pointer value regions.

10 Claims, 10 Drawing Sheets

METHOD AND DEVICE FOR CONTROLLING THE PHASE RELATION BETWEEN A HEAD DRUM AND TAPE FEED SYSTEM OF A MAGNETIC TAPE RECORDING DEVICE

CROSS REFERENCE TO RELATED APPLICATIONS

This application is a continuation-in-part of application Ser. No. 08/649,703 filed Jul. 30, 1996, now abandoned.

FIELD OF THE INVENTION

The invention concerns a method and a device for controlling the phase relation between a head drum and tape feed system of a magnetic tape recording device.

BACKGROUND OF THE INVENTION

In the search operation of an oblique track recording device, read- and recording track angles differ from one another. This has the result that due to the azimuthal decoupling only track segments can be read. In analogue recording devices, operating for example in accordance with the VHS standard, horizontal interference stripes occur. By selecting the speed, the number of visible interference stripes is determined (5-fold=4 interference stripes). In digital recording systems this effect likewise occurs. In the case of video recording devices with considerable segmentation (e.g. 12 recording tracks per frame) and data reduction (e.g. DCT=discrete cosine transformation) the picture correlation of the data of two adjacent tracks is no longer present. Furthermore the data have a greater weighting according to the reduction factor so that the absence of entire data groups can lead to a total dropout in some parts of the picture.

The recorded useful data signal is embedded in the normal way in synchronizing words, error protection data and pointers which indicate where the following data packet, together with the error protection data, belongs in the picture. The smallest readable quantity of information is thus a "synchronizing block", the data of which is input into a store. In the event of a dropout during the reading of new data, the whole synch-block is lost and for error recovery purposes recourse can be had to the old information.

In search operation of such a digital recording system the undesired effect arises that with specific constellations of head drum servo and tape feed servo during search operation. the same data zones are always read from the tape and updated on the screen, while other data zones are not read from the tape and the corresponding picture areas retain the old content. This is extremely disturbing in practice.

SUMMARY OF THE INVENTION

The aim of the invention is to reduce the disturbances which occur during search operation. This aim is fulfilled by the features of the invention described in Claim 1. Advantageous further developments of the invention are described in the sub-claims.

In accordance with the invention, the head drum phase and tape feed phase is controlled via the tape feed in such a manner that all the pointers are input equally often in an interval comprising a plurality of consecutive tracks= frames. In the case of the segmentation of 12 tracks for each frame with in each case 149 pointers (for the known DV-Standard), this means a search criterion for 1788 different items of stored information, from the frequency distribution of which the phases must be adjusted for a plurality of speeds. In an embodiment of the invention, on the recognition of an address information item (pointer) with associated data group, a store location in a measured value store is incremented or decremented, and the content of all the measured value store locations is continuously monitored and in dependence upon the count a change in phase of the tape feed is carried out.

Different solutions are possible in accordance with the invention for monitoring the measured value store locations and these will be described in the following.

Solution 1

Each item of address information (data pointer) is allocated a separate store location. The counter content of all the store locations per time unit should attain the same value, where the time units are determined by the respective operating mode. This is achieved by reading the counter value of each store location in a "round Robin" fashion, i.e. successively from pointer number 0 to 1787 and feeding this counter value to a digital/analog converter where the corresponding analog value is generated. The output signal of the DAC will be the analog representation of the accumulated pointer values within a given time frame. In the analog output signal areas with high voltage will occur where the pointer values have been read often. Low voltages will occur where the pointer values have been read seldom or never. This analog signal is fed to the servo control circuit. There, the signal is analyzed with respect to regions having high or low voltages. From the differences in height of the signal and in distances between the high and low voltages regions a correction value is calculated which will be used to generate a corresponding control voltage pulse which changes the phase relation so that preferably those data regions are read which have not been updated or seldom been updated.

Solution 2

Here, groups of pointer values are combined, so that measured value store locations are saved. The dropouts of the data signal read from the tape determine which pointer values are combined to a group. The first item of pointer value recognized after a dropout is stored as value 1 and the last item of pointer value recognized prior to a dropout is stored as value 2 in the measured value store together with the frequency of their occurrence. The change in phase of the tape feed is controlled digitally via digitally servo control in such manner that the occurring gaps are to be purposively filled up.

The dropout criterion is obtained from a PLL and/or from an envelope curve detector and/or a loss of synchronizing signal triggers the dropout criterion. From the calculated difference between the stored values 1 and 2 of consecutive data groups an increment size, by which the tape feed phase is to be changed, is calculated and used to control the phase relationship. The frequency value of occurrence of the data groups can be additionally taken into account for the calculation of the increment size.

Solution 3

This solution presupposes that low resolution pictures are additionally recorded for the different possible search modes in special purpose data areas of the tracks. Then in this selected search modes the phase is controlled in such a manner that the differences between the currently read pointer values and the wanted pointer values of the special purpose data areas are calculated. From this difference value a phase correction value is defined and output.

BRIEF DESCRIPTION OF THE DRAWING

In the following the invention will be explained making reference to the drawing wherein.

DETAILED DESCRIPTION

Figure 1:
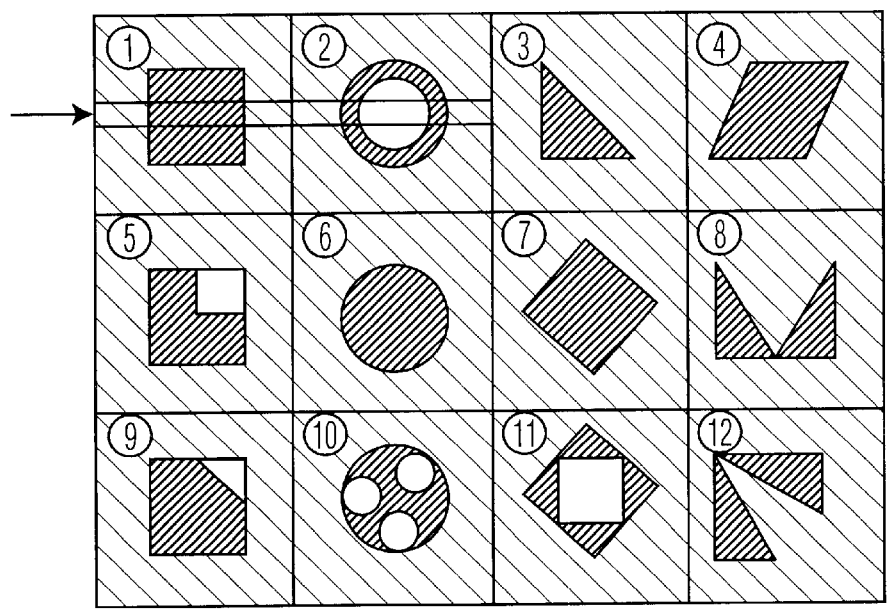
FIG. 1 illustrates the data store content of one frame.

FIG. 1 illustrates the data store content of one frame, where the graphic diagram does not express the video data content but marks data packets which are commonly further processed. Twelve fields 1–12 are present, which in turn represent the later content of the recording tracks. Thus this is a segmented recording which is selected whenever the data quantity is large and further splitting into parallel recording channels is no longer possible. The data items contained in the store thus cannot yet be recorded. It is necessary to insert items of error protection data, to provide protection zones for the locking of the PLL and the build-up of the playback amplifier stages (run-in/run-out) and to insert synchronizing words which facilitate the finding of the start or end of an item of data information. The channel modulation has not been shown, which latter additionally effects spectral shifts of the data signals by a further increase in redundancy (e g. in the case of 8/10 modulation in which output words of 10 bits breadth are formed from input words of 8 bits breadth), and inserts edge changes so that the system becomes self-clocked.

Figure 2:
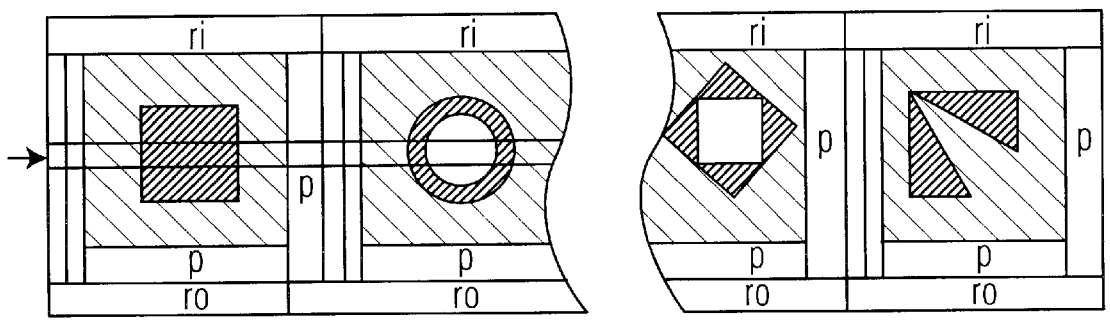
FIG. 2 illustrates the distribution of the data store contents between the track stores.

FIG. 2 illustrates how the data store content is distributed between the track stores. The items of additional information according to solution 3 can be inserted there in one of the left blank areas. The arrow marks a recording section which can be seen in detail in FIG. 3. The fields comprise items of error protection data p, as well as run-in synchronizing words ri and run-out synchronizing words ro.

Figure 3:
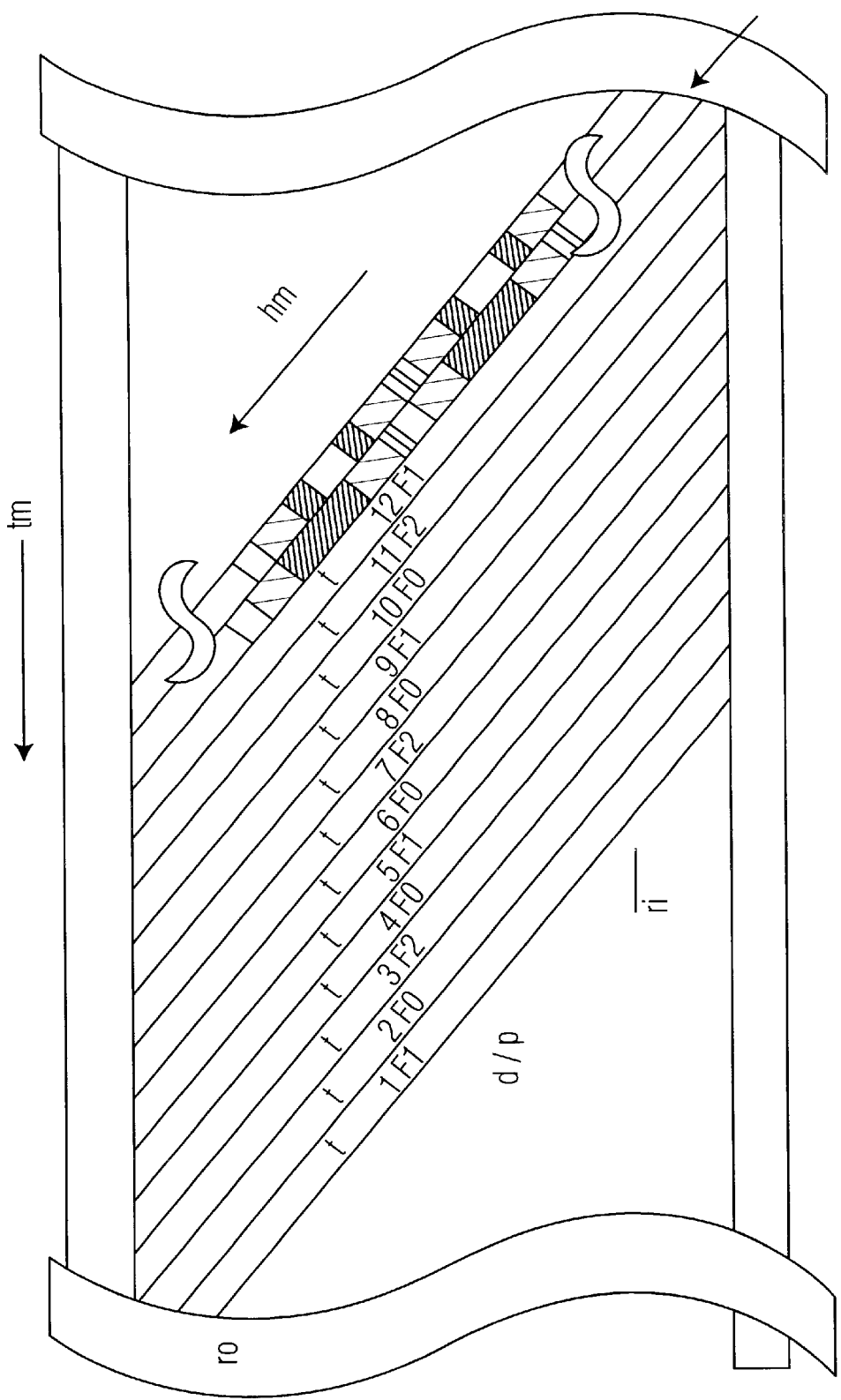
FIG. 3 illustrates the recording on the tape.

FIG. 3 illustrates the position of the recording on the tape with the head rotation hm, the tape feed tm and the items of error protection data p. 14 tracks t1 to t14 disposed one beside another can be seen, of which the twelve tracks referenced t1 to t12 belong to one frame. F0/F1/F2 represent pilot frequencies which are generated by the channel modulation and which are of no significance with regard to the following considerations. Of importance is the recognizable angular displacement of tracks disposed one beside another, which displacement arises due to different azimuthal angles of the heads and makes an important contribution to the cross-talk attenuation during playback.

This also is one reason for the dropouts in the play back signal when a magnetic head crosses a track which has been recorded with different azimuth angle. The right-hand tracks marked by an arrow indicate the expanded representation of a track portion, where the recorded data items are identical to those marked in FIG. 2 by the arrow.

Figure 4:
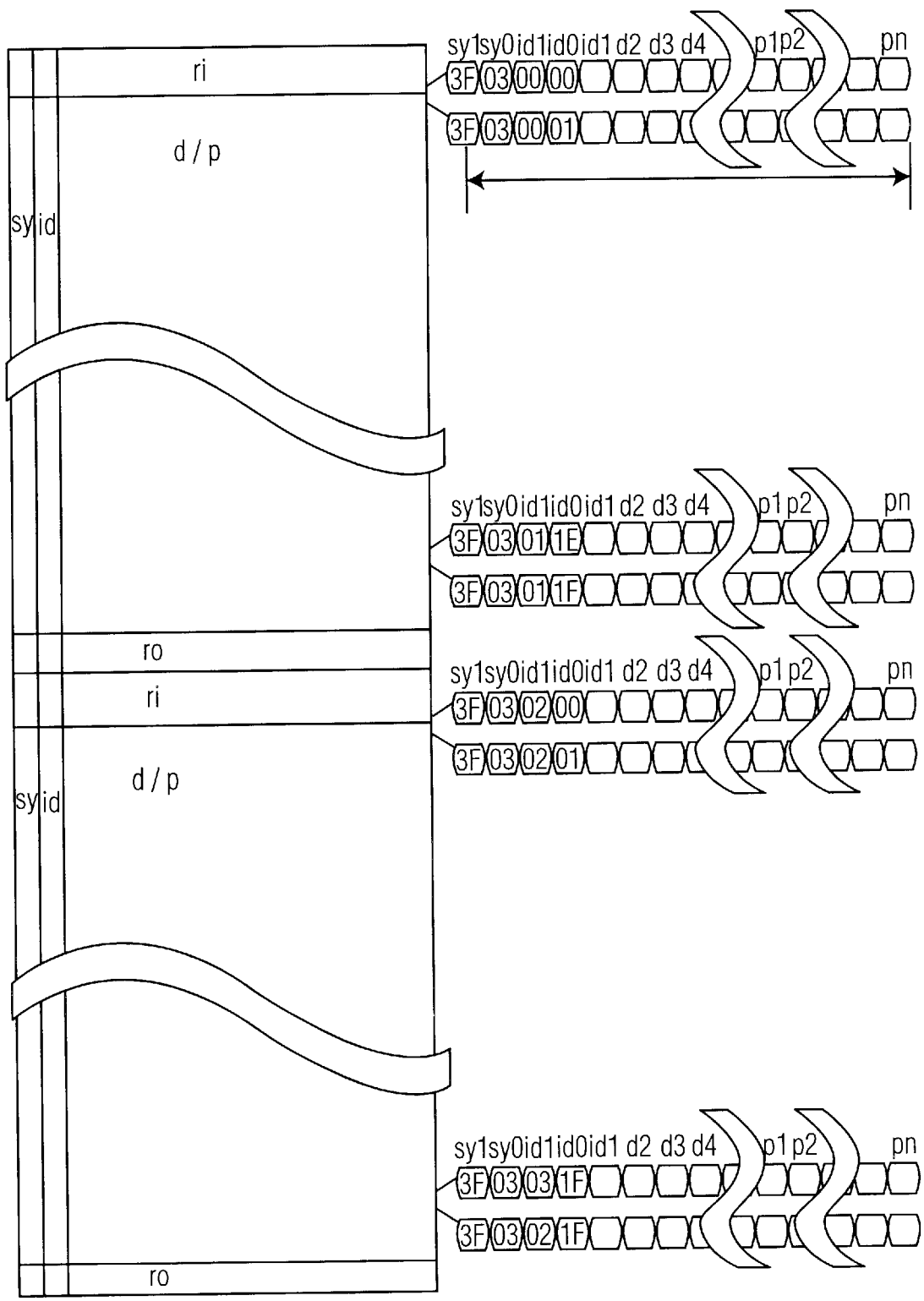
FIG. 4 illustrates the stored information for tracks 1 and 2.

In FIG. 4 the general composition of two tracks can be seen. Between the previously described run-in/run-out ri,ro zones a uniformly distributed data zone can be seen, where the data items d, with their associated error protection information p (parity), are divided into sections, the so-called synchronizing blocks sy. Each of these blocks bears, in addition to data- and error protection words d,p, synchronizing words sy for marking the start of the block, which by definition cannot occur in the normal data stream and thus permit later unequivocal recognition. The pointers id are of importance, which represent block numbering clearly defined within an associated quantity of information (here distributed between twelve tracks).

Figure 5:
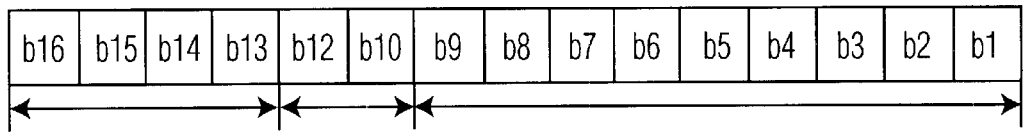
FIG. 5 illustrates pointer information.

An employed item of pointer information can be seen in FIG. 5. The synchronizing block number is identified by the bits b1–b9, while the tracks 1–6 are marked by the track counter bits b10–b12. The limitation to 6 tracks is possible because the data stream from the frame store is distributed between two simultaneously operating channels, the tracks 1,3,5,7,9,11 and 2,4,6,8,10,12 of which differ by virtue of the above described azimuthal angle. On playback the azimuthal decoupling comes into effect, which in all operating modes prevents a head from reading adjacent channel information (e.g. pointer values). Thus each block is unequivocally identified and by reading its pointer information it can be assigned to a location in the track store, in the frame store and later in the displayed picture. The blocks b13–b16 are reserved.

Figure 6:
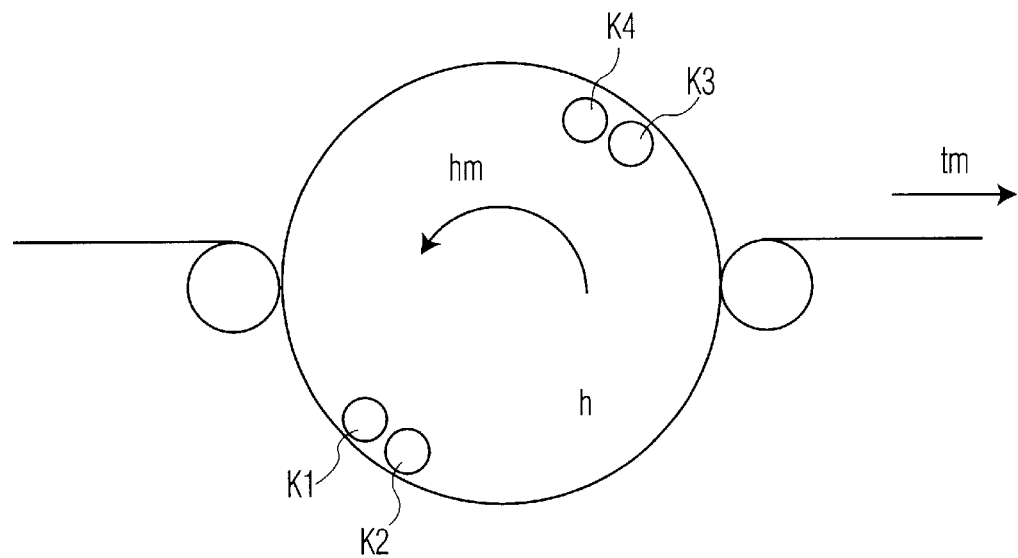
FIG. 6 illustrates the head drum with 4 heads.

FIG. 6 shows the head drum h with 4 heads K1–K4. As known in oblique track recording, the actual recording process is carried out by heads mounted on a rotating drum, and the tape feed tm ensures the necessary lateral displacement of the tracks relative to one another.

Figure 7:
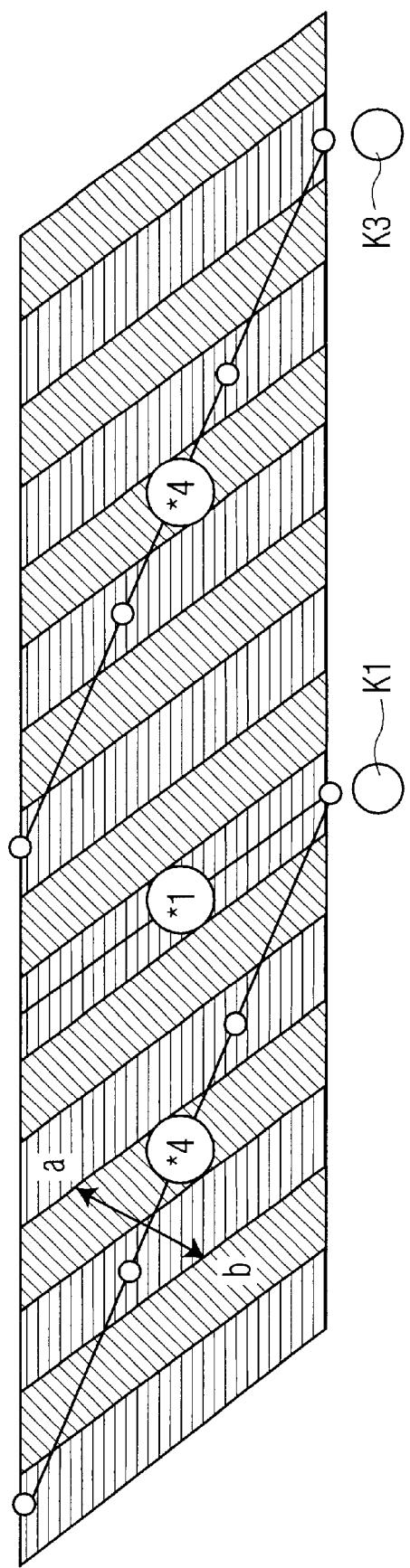
FIG. 7 illustrates recorded tracks and the scanning thereof.

FIG. 7 illustrates a track section (with track angles not true to scale because of representation techniques) which is scanned with different tape transport speeds The position *1 signifies that on playback the tape is transported at the recording feed speed with the result that the entire track is scanned. The gap length of the head generally corresponds to the track breadth, the drawing also being simplified in this respect. At the search speed (here *4) tracks become crossed and from these no information can be read because of the azimuthal displacement. Data gaps arise which in previously known systems lead to data loss always at the same locations.

Figure 7A:
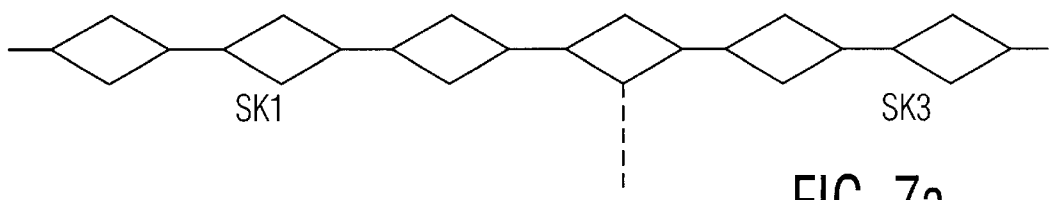
Figure 7B:
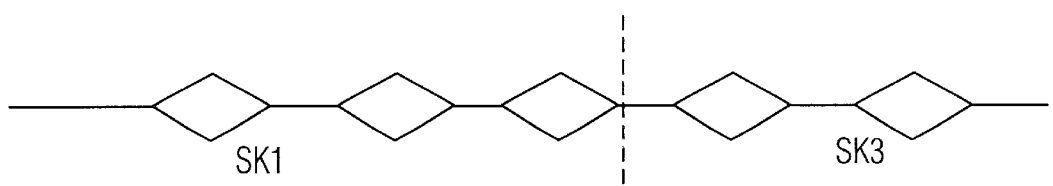
Figure 7C:
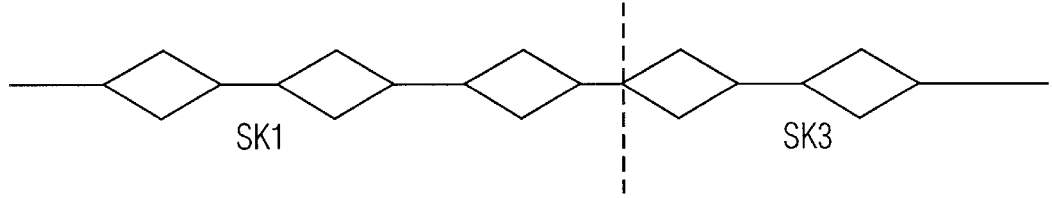

Via the pointer frequency interrogation, the criterion for the phase relationship between head drum system and tape feed system is obtained. The effect of a changed phase relationship is indicated by the arrow in FIG. 7. Relative to the normal phase position scanning location (thick line (*4)) a change in the tape feed phase in the direction (a) signifies a scanning of following information blocks, while a change in the direction (b) signifies a scanning of preceding information blocks. The corresponding playback signals at the output of the head amplifier, often also referred to as envelope curve, clearly indicate the time shifts (FIG. 7a–7c). Also shown are the signals of the head 1 SK1 and the signals of the head 3 SK3. FIG. 7a shows the playback signal in the case of search *4 in the normal phase position. FIG. 7b–c show the playback signal in the case of search *4 with a phase shift.

The phase shift of the tape feed system can be effected in different ways. A pulse or a sequence of pulses of determinate length serves to enlarge or reduce the control voltage of the tape feed motor, thereby enforcing a change in phase. The continuously engaged speed control system will maintain constant the state reached at the end of the pulse output. The continuously engaged speed control system is switched over to a slightly modified setpoint value until the desired phase scanning position is reached. Then a switch-back to the setpoint value takes place.

More details to the different solutions 1 to 3 are given in the following.

Solution 1

Figure 8:
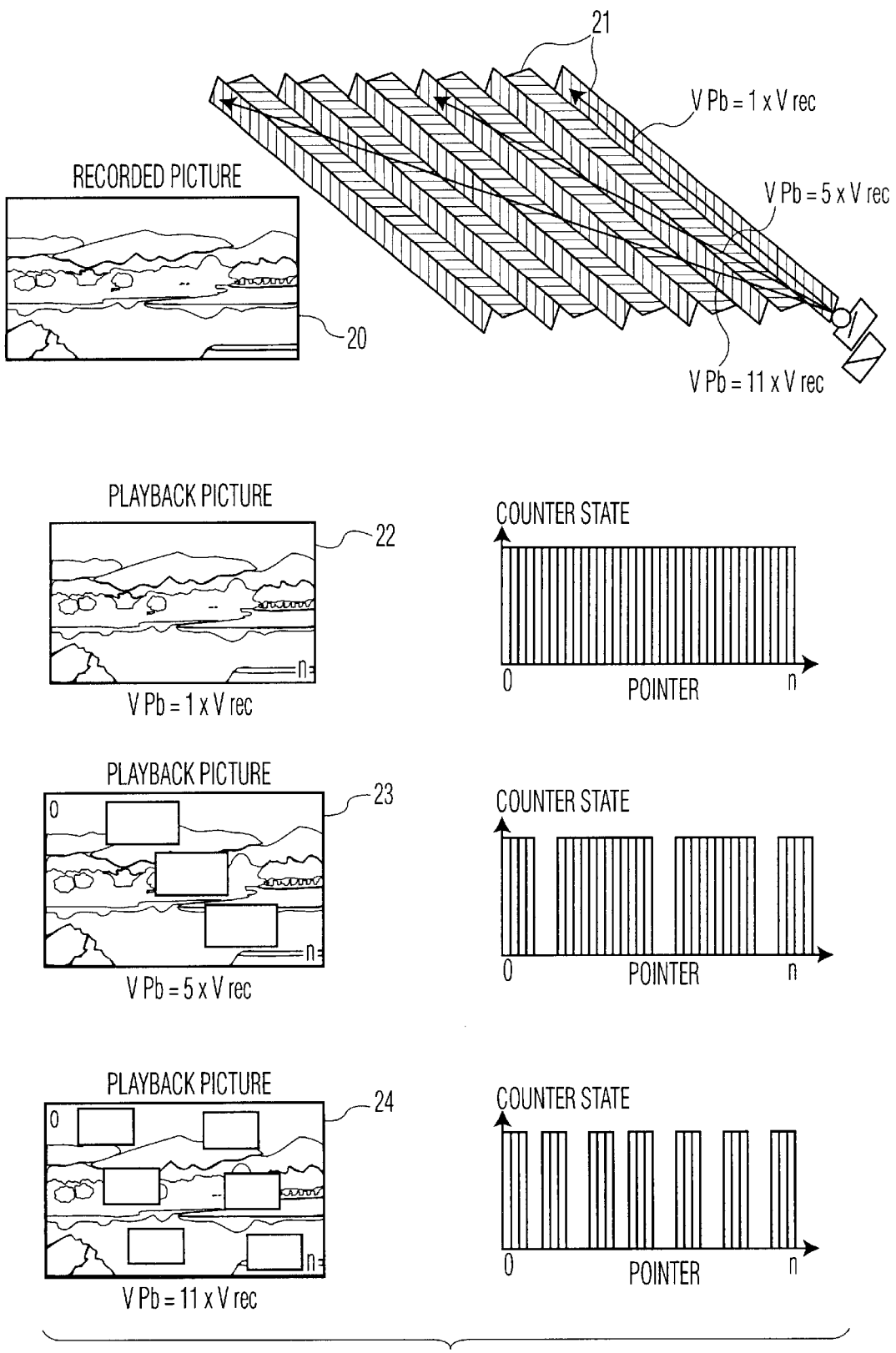
FIG. 8 illustrates phase control according to solution 1.

In FIG. 8 reference number 20 denotes a recorded picture. The tracks where the picture data are stored are denoted with reference number 21. Three arrows indicate different play back speeds *1, *5, *11. Reference number 22 denotes the playback picture when playback operation is performed with normal recording speed. Reference number 23 denotes the playback picture when playback operation is performed with search mode speed *5 and reference number 24 denotes the playback picture when playback operation is performed with recording speed *11.

In the search modes there are picture areas which will not be regenerated as indicated by the left blank areas in FIG. 8. Each time a pointer value is read from the tape, a corresponding location in a measured value store is incremented. All locations in the measured value store for which the corresponding pointer value has not been read remain unchanged. The pointer information is derived from the synch word detector, which is a 15 bit pattern comparator in case of the known DV format. This stage also synchronizes to the 8 bit word boundaries, following the synch information.

The pointer detector collects 3 words following the synch information (in DV format) and performs error correction for this ident information. The remaining bits are the individual pointers in a track (DV video=149) and tracks within a picture (DV standard=12; DV high definition=24).

An address change signal initiates a read-out of the RAM location in the measured picture store at the particular address corresponding to the read pointer value. The value is loading a counter, which is incremented afterwards. The increased counter value is now written to RAM at the same address.

All locations in the measured value store are read out and successively output to a digital/analog converter. The output signal of the DAC will be the analog representation of accumulated pointers within a given time frame, which will be adapted to the time reading one or a multiple of pictures. The read out period is determined by the frame pulse but a certain delay time can be used before the read out begins. The time period wherein read out takes place is short compared to the frame period so that fast phase adaptation is possible also in search mode with high speed.

All locations of the measured value store are preset to a selected start value when the search speed is changed to give all RAM cells the same content. In the easiest implementation the memory cells are set to zero.

An overflow of the counter can be omitted by decrementing all RAM cells periodically.

Figure 9:
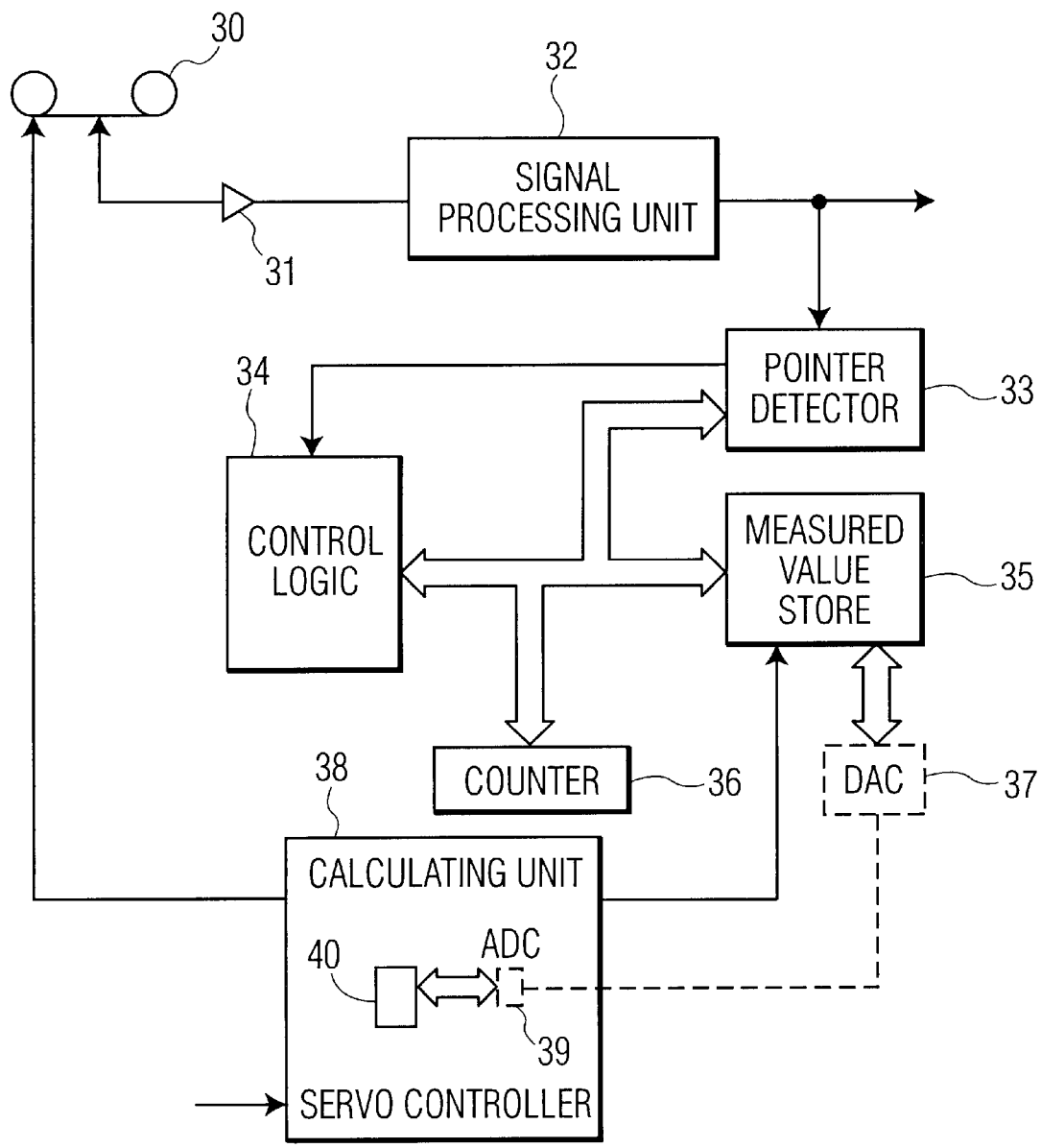
FIG. 9 illustrates a block diagram of the relevant parts of a magnetic tape recording device for the invention.

In FIG. 9 denotes reference number 30 the magnetic tape reading device. The read signal is amplified in amplifier 31 and then fed to signal processing unit 32. Therein, an equalizing stage, an envelope signal generator, an analog/digital converting stage and an error correction stage is located. All these stages are known by the skilled man and need not be explained in more detail. The resulting digital data is present at the output of processing unit 32.

For phase regulation these data is fed to pointer detecting stage 33. Therein, the bitstream is analyzed. Each time a pointer is detected, control logic 34 is informed The pointer value is read from control logic 34 and a corresponding location in measured value store 35 is read. Measured value store 35 may preferably a DPRAM so that independent read/write operations may be performed simultaneously. The content of the read location is loaded into counter 36 which is incremented afterwards. The resulting value is written back to its location in store 35.

After a minimum amount of frame pulses has been received in servo control circuit 38 a delay time is started and after expiration of the delay time the locations in measured value store 35 are successively addressed and read out under control of servo control circuit 38. The read values are fed to digital/analog converting circuit 37. The thus generated analog signal is fed to servo control circuit 38 where it is analyzed. Here an digital/analog conversion is performed first. The analog signal will have regions with high voltage and regions with low voltage dependent how often the corresponding pointer values has been read from tape. Based on the distance between two regions with high voltage and the difference in height between the regions with high or low voltage a correction pulse is calculated also under consideration of the present search mode (tape speed). The corresponding control pulse is generated and fed to the tape feed motor for correcting the phase.

Digital/analog converter 37 and analog/digital converter 39 are optional and can be omitted when a servo control circuit with digital data bus is used. The digital data will be directly fed to servo control circuit 38 in this case. The calculation of the control pulse in servo control circuit 38 need not be performed when a table with the corresponding correction values is used and the above mentioned differences and distances are used as an input to the table.

Solution 2

Figure 10:
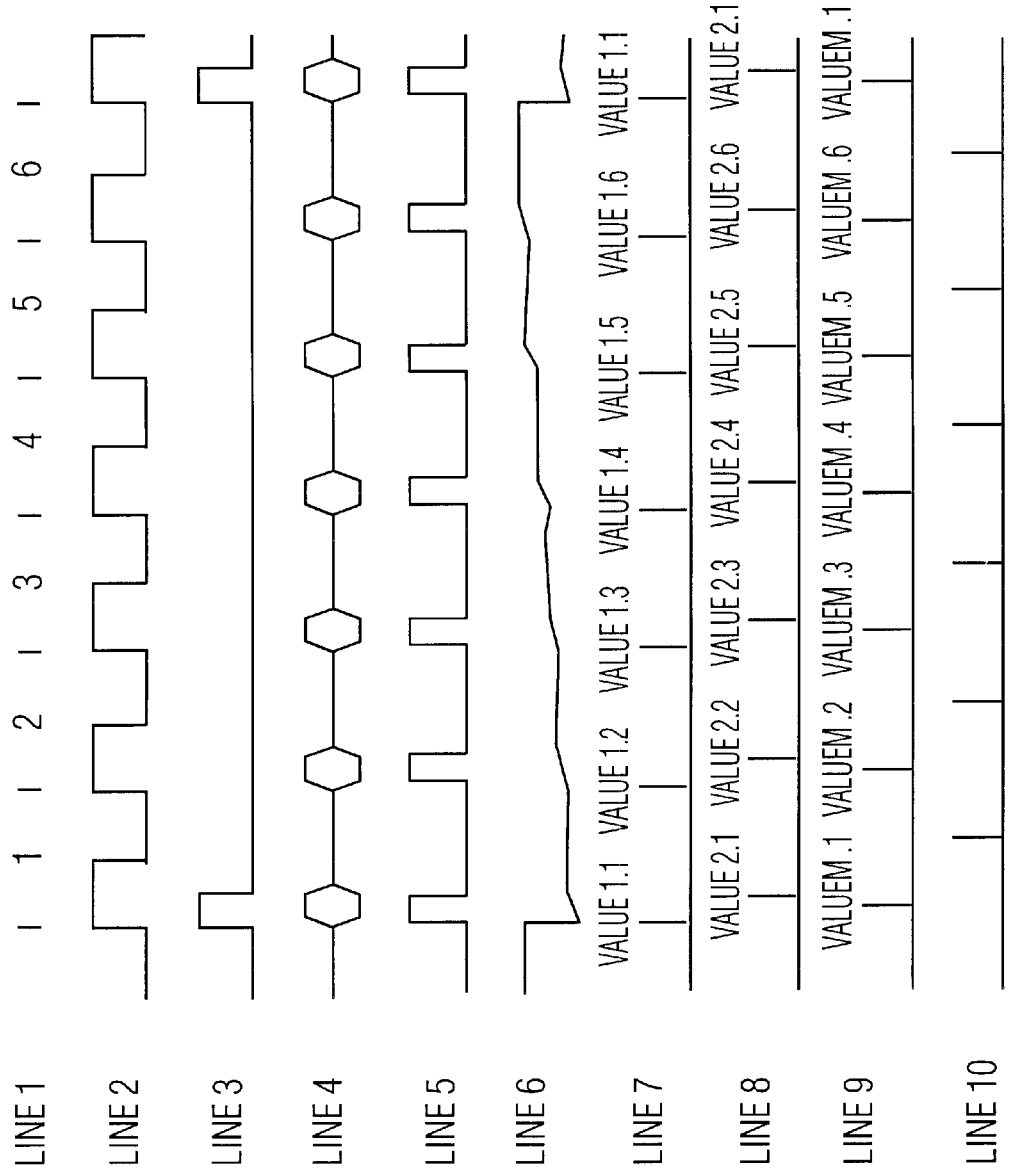
FIG. 10 illustrates phase control according to solution 2.

In FIG. 10 the first line indicates the number of head drum revolutions. For one frame 6 revolutions of the head drum are necessary in case of normal play back mode. Line 2 shows the head drum phase impulse for one head. Line 3 shows the frame impulse. Line 4 shows the play back envelope signal of the head. The output signal of the envelope signal detector is shown in line 5. Line 6 shows the phases where pointer values are read in an exemplary search mode. Each time where the curve rises, pointer values could be read. In the phases where the curve is flat no pointer values have been read. The time points where the first pointer value could be read after a dropout are indicated in line 7 The time points where the last pointer value could be read before the next dropout are indicated in line 8. The corresponding pointer values and the counter values for this pointers are stored in memory. The mid value of each read data area is determined by calculating the difference of the start and end pointer values (shown in line 9). Furthermore the mid value for each dropout region is determined as shown in line 10. From these values the best phase change value can easily be derived. The phase correction value is given to the feed tape servo control circuit which generates a corresponding pulse to adjust the feed tape phase accordingly. The block diagram of FIG. 9 is also valid for this solution.

Solution 3

Figure 11:
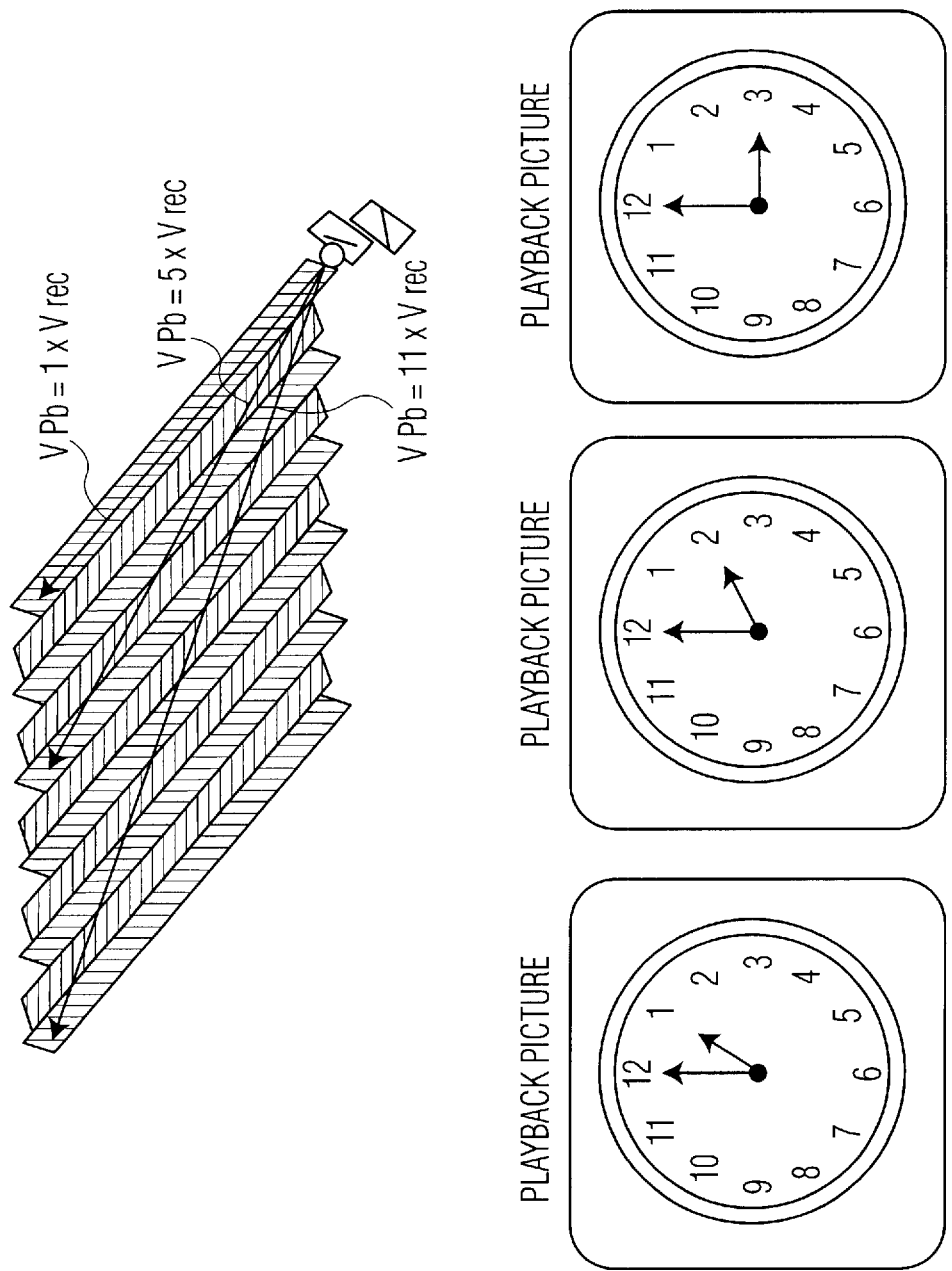
FIG. 11 illustrates phase control according to solution 3.

According to solution 3 there are low resolution pictures which are stored on the tape on selected data areas. These pictures are to be displayed during the search mode. The data areas for these pictures are distributed over the tracks as shown in FIG. 11. The data areas of one frame are all automatically read in the corresponding search mode, when the right feed tape phase is found. For finding this right phase, once again the pointer values are read and stored as explained above according to solution 2. A phase correction value is calculated by using the difference value between the read pointer values and the wanted pointer values for this search mode. The block diagram of FIG. 9 is in principle also valid for this solution provided that in DPRAM 35 or in servo control circuit 38 also the wanted pointer values are stored for comparison purposes.

An alternative embodiment for the measured value store is to use two different memories with identical capacity instead of the DPRAM. While the first one is being updated during the reading operation, the second one is read out for phase control purposes. If both actions have been finished in assigned time limit, the function of both memories is switched over so that the second one is being updated while the first one is read out for phase control. The content in the first memory could be copied in the second memory before switch over action takes place.

What is claimed is:

1. Method for controlling the phase relation between a head drum and tape feed system of a magnetic recording device for digital picture information, wherein the digital picture data is subdivided in blocks having assigned a pointer value each and wherein the pointer values define which part of the picture the block of picture data represents, characterized by the steps of:

incrementing or decrementing a location in a measured value store on recognition of a corresponding pointer value with the corresponding data block in the reproduced data system;

monitoring the content of the locations in the measured value store after a certain amount of reproducing time by means of:

determining the distance between pointer value regions which have been reproduced more often than the regions in-between, thereby taking into account the difference in reproducing frequency between the more often reproduced regions and the more seldom reproduced regions according to the measured value store entries and determining a phase correction value for the control of the phase relation between head drum and tape feed system based on the distance between pointer value regions.

2. Method as claimed in claim 1, wherein the locations of the measured value store are successively read and fed to a digital/analog conversion circuit and the analog signal is fed to a servo control circuit.

3. Method as claimed in claim 1 wherein for each pointer value of the picture a separate store location is allocated.

4. Method for controlling the phase relation between a head drum and tape feed system of a magnetic tape recording device for digital picture information wherein the digital picture data is subdivided in blocks having assigned a pointer value each and wherein the pointer values define which part of the picture the block of picture data represents, characterized by the steps of:

storing in corresponding locations in a measured value store the recognized pointer values at the beginning or ending of correctly read data areas;

determining the distance between the pointer values of consecutively correctly read data regions; and determining a phase correction value for the control of the phase relation between head drum and tape feed system based on the distance between pointer value regions.

5. Method as claimed in claim 4, wherein a dropout criterion is obtained from a PLL and/or the dropout criterion is obtained from an envelope curve detector and/or a loss of synchronizing signal triggers the dropout criterion.

6. Method for controlling the phase relation between a head drum and tape feed system of a magnetic tape recording device for digital picture information wherein the digital picture data is subdivided in blocks having assigned a pointer value each and wherein the pointer values define which part of the picture the block of picture data represents wherein for selected operation modes additional picture data is stored in the predetermined data areas of the tape which will be read out in the selected operation modes, characterized by the steps of:

storing in corresponding locations in a measured value store the recognized pointer values at the beginning or ending of correctly read data areas;

determining the distance between the pointer values of consecutive correctly read data regions; and determining a phase correction value for the control of the phase relation between head drum and tape feed system based on the distance between pointer regions.

7. Device for controlling the phase relation between a head drum and tape feed system of a magnetic recording device for digital picture information comprising:

a detector for pointer values (33) recorded on tape which define which part of the picture the corresponding read picture data represents, a measured value store (35) for storing an information corresponding to a detected pointer value which represents the amount of detections of the pointer value in an assigned location, a counter (36) for incrementing or decrementing the assigned location in the measured value store (35) each time the corresponding pointer value has been detected, a calculating unit (40) for determining a a calculation unit for determining the distance between pointer value units regions which have been reproduced more often than regions in-between, thereby taking into account the difference in reproducing frequency between the more often reproduced regions and the more seldom reproduced regions according to the measured value stored entries, and for determining a phase correction value for the control of the phase relation between head drum and tape feed system based on the distance between pointer value regions; and a servo control unit for generating the phase correction signal and applying it to the tape feed system.

8. Device according to claim 7, wherein the locations in the measured value store are successively read in one period under control of the unit which contains the calculating unit (40).

9. Device according to claim 8, wherein the unit which contains the calculation unit (40) is the servo control unit (38).

10. Device according to claim 7 wherein the values stored in the measured value store are fed to a digital/analog circuit (37) and a analog/digital circuit (39) before they are analyzed in the calculating unit (40).

* * * * *